(No Model.)
W. A. SAWYER.
MACHINE FOR MEASURING THE AREA OF SURFACES.
No. 329,597. Patented Nov. 3, 1885.
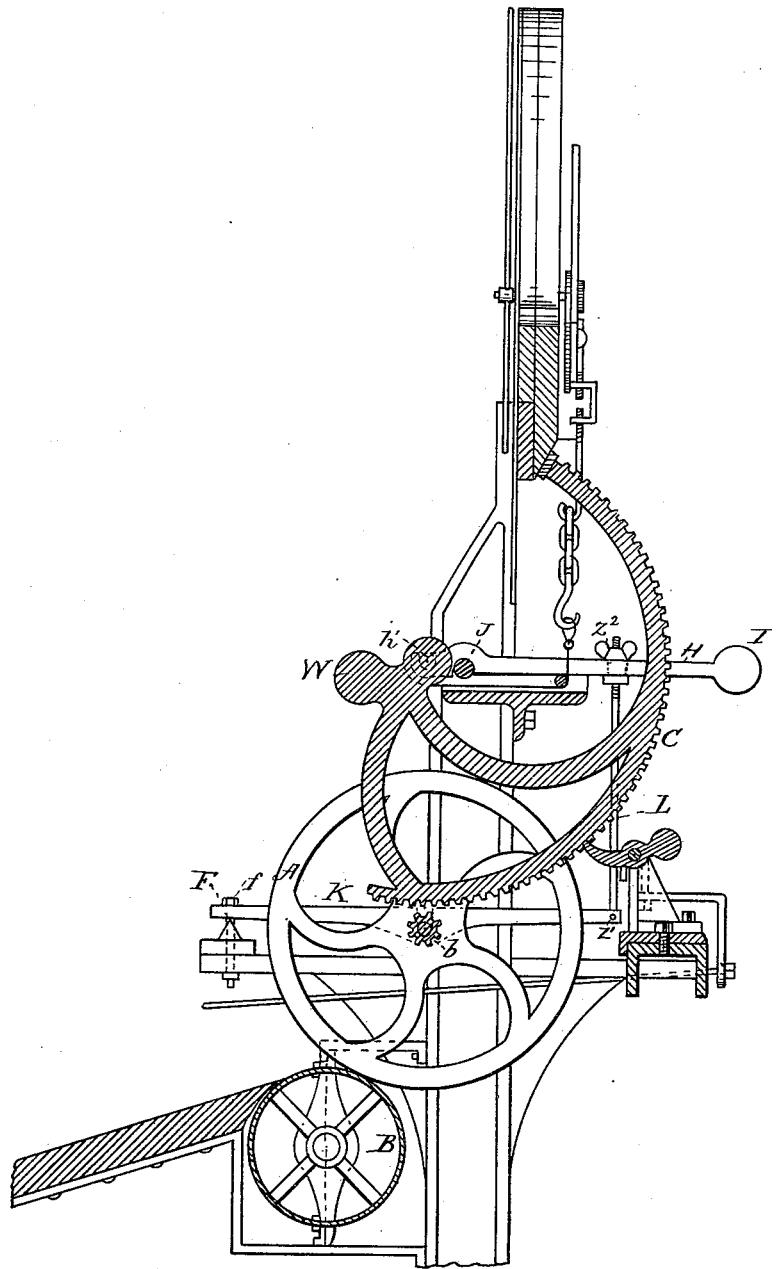
WITNESSES
Frank G. Parker
Wm T. Gilbert
INVENTOR
William A. Sawyer
by
W. B. H. Dowse
Atty.

United States Patent Office.

WILLIAM A. SAWYER, OF DANVERSPORT, ASSIGNOR TO THE SAWYER LEATHER MACHINERY COMPANY, OF BOSTON, MASSACHUSETTS.

MACHINE FOR MEASURING THE AREAS OF SURFACES.

SPECIFICATION forming part of Letters Patent No. 329,597, dated November 3, 1885.

Application filed May 12, 1884. Renewed May 25, 1885. Serial No. 166,645. (No model.)

*To all whom it may concern:*

Be it known that I, WILLIAM A. SAWYER, of Danversport, in the county of Essex and State of Massachusetts, have invented certain new and useful Improvements in Machines for Measuring the Areas of Surfaces, of which the following is a specification.

My invention relates to improvements in machines for measuring and registering the superficial areas of sheets, more especially those of irregular outline—such as hides and skins—in which a greater or less number of a series of wheels revolving in contact with a roller are raised according to the varying width of the article passed through, and each wheel when so raised actuates a device for winding up a cord or the like. The amount of cord wound by the different wheels is aggregated and indicated on a graduated scale.

It will not be necessary to go into the details of the general construction of the machine, as these matters are fully set forth in Letters Patent granted to me October 2, 1883, No. 286,078, of which this application is an improvement.

The essential feature of my improvements consists in supporting the axes of the wheels which run over the hide or other surface to be measured and the axes of the toothed segment with which they gear by a system of levers so constructed that when one of the measuring-wheels is raised it at the same time lowers its corresponding toothed segment, bringing the pinions on the axes of the measuring-wheels into gear with the toothed segments. By this arrangement the machine will measure thinner material than when the measuring-wheels are alone capable of being raised, for the motion of the measuring-wheel upward, produced by the insertion of the material to be measured, is transmitted by a system of levers to the toothed segment, which is thereby forced down toward the pinion $a$ distance which will vary according to the proportions given to the lower arms.

My invention is fully shown in the single sheet of drawings annexed, in which there is but one figure, which is a side elevation partly in section.

A represents a side view of one of the measuring-wheels, which rests normally upon a roller, B, which is revolved by any well-known means. To the axis of each of the wheels A is secured a pinion, $b$, which is thrown into gear with the toothed segment C when a hide, side of leather, or other material to be measured is introduced between the measuring-wheel A and the roller B.

H is a lever balanced upon J as a fulcrum, and having a hollow open bearing, $h'$, to carry the toothed segment C. The other end of the lever H has a counter-weight, I. The axis of the measuring-wheel A passes through a lever, K, about midway of its length, and said lever is supported upon a fulcrum, F, and is prevented from slipping or having any lateral motion by a fast or bolt, $f$, which passes through a hole in the lever and fulcrum just large enough to allow a little play. To the outer end of the lever K is attached a vertical rod, L, by means of a pin, $Z'$, the upper end of L passing through a hole in the lever H, and adjustably secured to the lever H by means of the thumb-nut $Z^2$.

The operation of the machine is as follows: A hide being inserted between the roller or drum B and the series of measuring-wheels is drawn forward and lifts the wheel A a distance equal to the thickness of the hide. The wheel A, when lifted, carries with it the lever K, and, by means of the rod on its outer end, raises the long arm of the lever H, depressing the shorter arm and bearing $h$, lowering with it the toothed segment C, and thus, by a reciprocal motion, the one down and the other up, the toothed segment C and the pinion $b$ are brought into gear. When the hide has passed through the machine, the counter-weight I and the weight of the wheel A bring the parts each to their original position.

The relative motion of the toothed segment C and pinion $b$ can be varied by changing the relations of the lever-arms K and H.

In measuring material of widely different thickness the length of rod L can be varied so that the toothed segment and pinion are more or less separated.

For the purpose of greater convenience of operation, I place the roller B a little farther forward than in the previous machines I have made; but this does not alter its operation. I also put the weight W nearer the center of motion of the toothed segment.

My invention enables me to measure the areas of the thinnest surfaces without any special adjustment.

What I claim as my invention is—

The combination, with a series of wheels having toothed hubs and a series of toothed segments located over these hubs, of pivoted lever-supports for said segments and for said wheels, said pivoted lever-supports being connected, whereby the position relative to each other of said toothed hubs and their corresponding toothed segments is controlled, all arranged and operating substantially as set forth.

In witness whereof I have hereunto set my hand.

WILLIAM A. SAWYER.

Witnesses:
WM. B. H. DOWSE,
WM. T. GILBERT.